US010513983B2

(12) United States Patent
Butcher et al.

(10) Patent No.: US 10,513,983 B2
(45) Date of Patent: Dec. 24, 2019

(54) FUEL/OIL MANIFOLD (71) Applicant: United Technologies Corporation, Hartford, CT (US)

(72) Inventors: Evan Butcher, Manchester, CT (US); Benjamin T. Fisk, East Granby, CT (US); Wendell V. Twelves, Glastonbury, CT (US); Caitlin Oswald, Vernon, CT (US); Andre Herman Troughton, Windsor Locks, CT (US); Bryan P. Conway, Mansfield Center, CT (US)

(73) Assignee: United Technologies Corporation, Farmington, CT (US)

( * ) Notice: Subject to any disclaimer, the term of this patent is extended or adjusted under 35 U.S.C. 154(b) by 657 days.

(21) Appl. No.: 15/022,653

(22) PCT Filed: Sep. 26, 2014

(86) PCT No.: PCT/US2014/057593
§ 371 (c)(1),
(2) Date: Mar. 17, 2016

(87) PCT Pub. No.: WO2015/048374
PCT Pub. Date: Apr. 2, 2015

(65) Prior Publication Data
US 2016/0208708 A1 Jul. 21, 2016

Related U.S. Application Data (60) Provisional application No. 61/883,871, filed on Sep. 27, 2013.

(51) Int. Cl.
F02C 7/22 (2006.01)
B22F 5/10 (2006.01)
(Continued)

(52) U.S. Cl.
CPC ............. *F02C 7/222* (2013.01); *B22F 5/10* (2013.01); *F02C 7/06* (2013.01); *B22F 3/1055* (2013.01);
(Continued)

(58) Field of Classification Search
CPC .......... F02C 7/222; F16L 41/03; Y02P 10/295
See application file for complete search history.

(56) References Cited

U.S. PATENT DOCUMENTS 5,531,484 A 7/1996 Kawano
6,340,011 B1 1/2002 Jainek
(Continued)

FOREIGN PATENT DOCUMENTS

CN 202300713 U 7/2012
CN 203176573 U 9/2013
(Continued)

OTHER PUBLICATIONS

Extended European Search Report for EP Application No. 14849740.7, dated May 30, 2017, 7 pages.
(Continued)

Primary Examiner — Arun Goyal
(74) Attorney, Agent, or Firm — Kinney & Lange, P.A.

(57) ABSTRACT

A fuel/oil manifold includes first and second manifold flanges and a manifold tube. The first and second manifold flanges are located in non-parallel planes with respect to one another. The manifold tube is connected at a first end to the first manifold flange and at a second end to the second manifold flange and includes at least one turn between the first and the second end that includes a non-zero tube bend radius defined as the ratio of a turn radius to a diameter of the manifold tube.

18 Claims, 12 Drawing Sheets (51) Int. Cl.
*F02C 7/06* (2006.01)
*F16L 41/03* (2006.01)
*B22F 3/105* (2006.01)

(52) U.S. Cl.
CPC ........... *F05D 2230/31* (2013.01); *F16L 41/03* (2013.01); *Y02P 10/295* (2015.11)

(56) References Cited

U.S. PATENT DOCUMENTS

| | | | |
|---|---|---|---|
| 7,992,379 B2 * | 8/2011 | Suzuki | F01N 3/035 60/286 |
| 2002/0069647 A1 | 6/2002 | Mayersky et al. | |
| 2004/0255460 A1 | 12/2004 | Bampton et al. | |
| 2005/0132984 A1 * | 6/2005 | Fuerlinger | B64D 27/04 123/54.1 |
| 2011/0100020 A1 * | 5/2011 | Zhang | F01D 5/185 60/806 |
| 2012/0042970 A1 | 2/2012 | Klages et al. | |

FOREIGN PATENT DOCUMENTS

| | | |
|---|---|---|
| EP | 1780386 A1 | 5/2007 |
| EP | 2434129 A2 | 3/2012 |
| EP | 2570727 A2 | 3/2013 |
| GB | 2440546 A | 2/2008 |
| WO | WO 1980/000593 A1 | 4/1980 |
| WO | WO 2012/166546 A2 | 12/2012 |

OTHER PUBLICATIONS

International Searching Authority, PCT Notification of Transmittal of the International Search Report and the Written Opinion, dated Jan. 29, 2015, 14 pages.
Communication Pursuant to Article 94(3) EPC for EP Application No. 14849740.7, dated Sep. 2, 2019, pp. 6.

* cited by examiner

FUEL/OIL MANIFOLD

BACKGROUND

The present invention is related to manifolds, and in particular to novel manifold geometries.

A manifold is a component that communicates a fluid (e.g., gas or liquid) via one or more manifold tubes between different inlets and outlets. Manifolds are utilized in a variety of industries and applications for this purpose. For example, in the aircraft industry, manifolds are employed to communicate fuel and oil between various inlets and outlets, which in turn are connected to various components such as pumps and heat exchangers. A typical manifold is constructed using a casting process in which the envelope of the manifold is defined, followed by a coring process in which the passages used for the gas and/or liquid are drilled. This type of manifold is known as a cored component because of the drilling process used to create the flow passages. Although the design and manufacture of such manifolds are well understood, the performance, weight and/or cost of these manifolds may be improved by utilizing different geometries not available via traditional casting/coring processes.

SUMMARY

A fuel/oil manifold includes first and second manifold flanges and a manifold tube. The first and second manifold flanges are located in non-parallel planes with respect to one another. The manifold tube is connected at a first end to the first manifold flange and at a second end to the second manifold flange and includes at least one turn between the first and the second end that includes a non-zero tube bend radius defined as the ratio of a turn radius to a diameter of the manifold tube.

BRIEF DESCRIPTION OF THE DRAWINGS

FIGS. 9a-9d are partial cross-sectional views of various manifold tube geometries according to various embodiments of the present invention.

DETAILED DESCRIPTION

Figure 1:
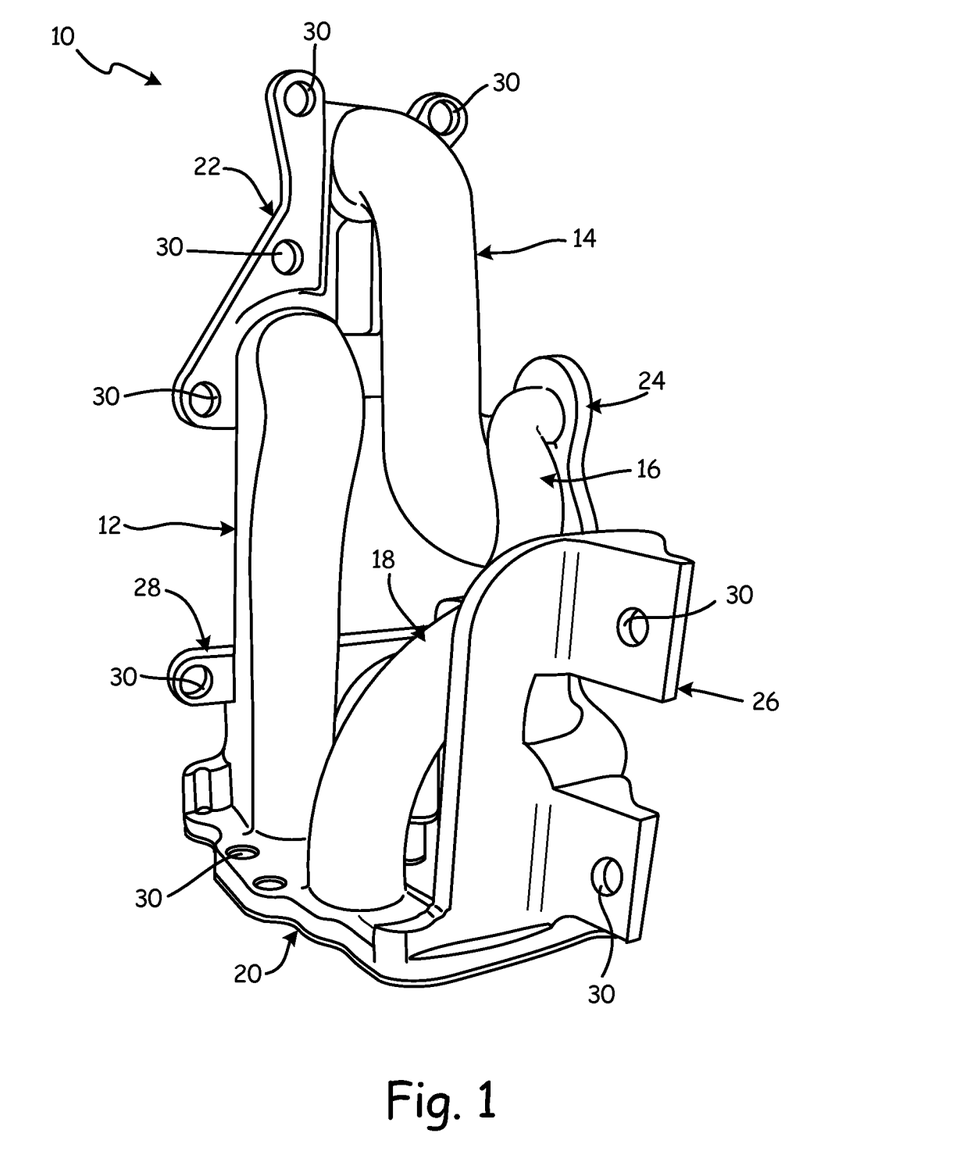
FIG. 1 is a perspective view of a manifold according to an embodiment of the present invention.

FIG. 1 is a perspective view of manifold 10 according to an embodiment of the present invention. In the embodiment shown in FIG. 1, manifold 10 includes manifold tubes 12, 14, 16, and 18, and manifold flanges 22, 24, 26, and 28. Each manifold tube 12, 14, 16 and 18 is attached at one end to one of the plurality of manifold flanges 22, 24, 26, and 28. Each manifold flange includes one or more apertures 30 used to bolt or otherwise secure manifold 10 to adjacent components (e.g., pumps, heat exchangers, etc., not shown in this view).

In the embodiment shown in FIG. 1, manifold 10 is a fuel/oil manifold employed in a gas turbine engine. For example, manifold tube 18 communicates fuel between a fuel inlet and a fuel outlet. For example, a fuel pump (not shown) may be connected to manifold flange 24 to receive fuel provided via the fuel outlet. Similarly, manifold tubes 12 and 14 may be utilized to communicate oil to and from a heat exchanger (not shown) connected to manifold flange 22.

Although not located within a gas path (i.e., hot exhaust flowpath) of the gas turbine engine, manifold 10 must still be capable of withstanding high temperatures. To this end, manifold 10 is constructed of a material (typically metal) that is capable of withstanding the high temperatures associated with use in gas turbine engines.

In a typical fuel/oil manifold as known in the prior art, the manifold is constructed via a casting process in which a rectangular manifold envelope is created without any flow passages, followed by a coring process in which fluid passages are drilled (i.e., coring of the manifold envelope). The coring process includes drilling a fluid passage from each of the fluid inlets/outlets into the manifold envelope. For example, to create manifold tube 12 (as discussed with respect to manifold 10), a typical manifold would drill a first passage from mounting flange 22 in a first direction, while a second passage would be drilled from mounting flange 20 in a second direction, perpendicular to the first direction. The intersection of the drilled first and second passages results in a right angle. Furthermore, because passages are drilled, the original casting process requires the manifold envelope to be large enough to accommodate the passages that must be subsequently drilled. A benefit of the present invention is that rather than starting with an envelope and drilling out passages, resulting in a large amount of wasted material between adjacent fluid passages, the present invention forms manifold tubes that do not require additional material located between adjacent fluid passages. No material is thus required between adjacent manifold tubes. As a result, fuel/oil manifold 10 provides significant weight savings over traditional fuel/oil manifolds.

In the embodiment shown in FIG. 1, each of the turns associated with manifold tubes 12, 14, 16 and 18 is curved to provide a fluid passage within the manifold tubes that does not include right angles. Providing curved turns for manifold tubes 12, 14, 16, and 18 improves the flow of fluids through the fluid passages. The tube bend radius (e.g., rate of change or degree of the turn, discussed in more detail with respect to FIG. 2, below) may be selected based on the flow characteristics of the fluid.

In one embodiment, additive manufacturing is used to create manifold 10. A number of additive manufacturing processes, such as electron beam melting (EMB), may be used. In general, additive manufacturing is a process by which a component is created by creating a plurality of stacked layers on top of one another. The layers are built directionally, and can be used to create complex shapes. For example, electron beam melting is a process by which a metal powder is deposited on a substrate or component base layer, and an electron beam is applied to select locations to melt the powder and form a first layer of the component. A new layer of metal powder is deposited, and the electron beam is applied again to melt the powder at select portions and form a second layer adjacent to the first. This process continues, layer by layer, until the desired component has been created. The technology manufactures parts by melting metal powder layer by layer with an electron beam in a high vacuum. For example, manifold 10 may be constructed via a plurality of layers, each stacked on top of a previous layer to form complex shapes such as those shown in FIG. 1. A benefit of this approach is that it eliminates the casting and coring process and allows for the construction of complex geometries not previously contemplated with respect to fuel/oil manifolds.

As described in more detail with respect to FIGS. 2A-14, manifold 10 may take advantage of one or more of the structural features subsequently disclosed to improve the performance, weight, and cost of manifold 10 as compared to traditional cored component-type manifolds.

Figure 2:
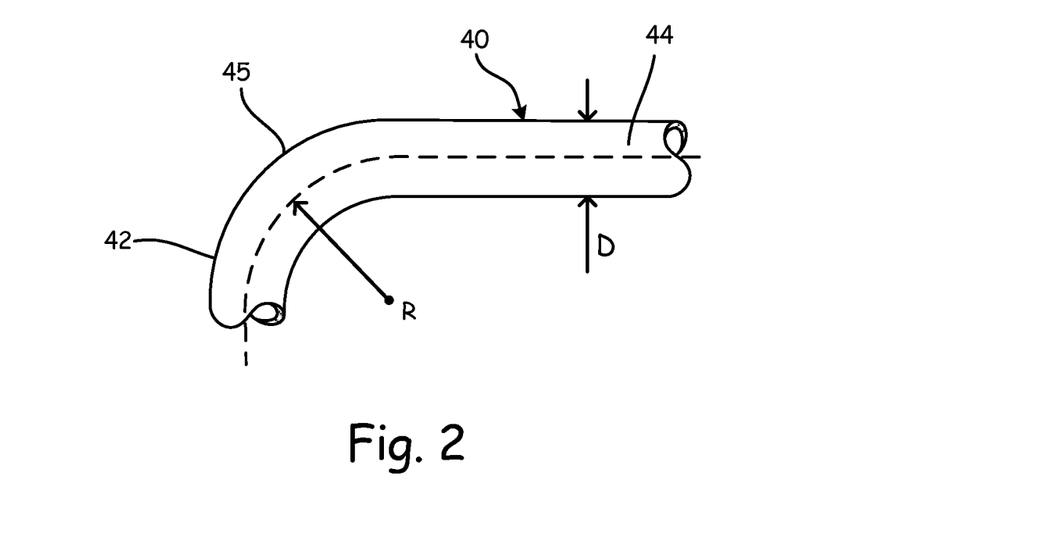
FIG. 2 is a side view of a manifold tube according to an embodiment of the present invention.

FIG. 2 is a side view of manifold tubes 40 according to an embodiment of the present invention. Manifold tube 40 represents a possible geometry that may be utilized in a fuel/oil manifold such as manifold 10 described with respect to FIG. 1.

Manifold tube 40 includes first end 42 and second end 44, and a curved section 45 located between the first and second ends that is defined by an outer circumference and an inner circumference. In one embodiment, the tube bend radius is defined by the relationship between the radius R of the circle that would be created based from a mean circumference located between the inner and outer circumference of curved section 45, and the diameter D of tube 40a as described in Equation 1.

$$\text{Tube bend radius} = R/D \qquad \text{Equation 1}$$

Therefore, if the diameter is D has a length D, and the radius has a length 3D, then the tube bend radius is 3. As the radius decreases (implying a tighter corner), the ratio will decrease. In one embodiment, the tube bend ratio may be less than or equal to one. A benefit of the present invention is the improved flow characteristics provided by utilizing curved section 45 rather than right angles. In addition, the present invention allows the tube bend radius to be selected for a given application.

Figure 3:
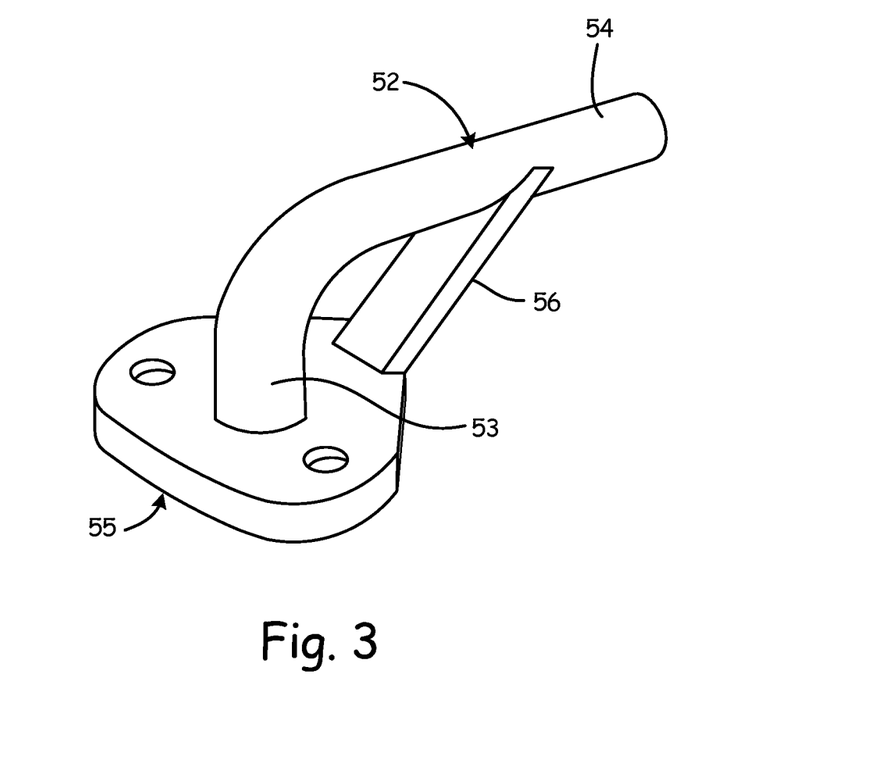
FIG. 3 is a perspective view of a manifold tube with strut support according to an embodiment of the present invention.

FIG. 3 is a perspective view of a manifold tube 52 with strut support 56 according to another embodiment of the present invention. Manifold tube 52 includes first end 53 and second end 54. Manifold tube 52 is connected to manifold flange 55 at first end 53, while second end 54 extends away from manifold flange 55. To provide rigidity and support to manifold tube 52 (e.g., increase the natural frequency of the manifold tube), strut support 56 is connected between second end 54 of manifold tube 52 and manifold flange 55. In one embodiment, manifold tube 52, manifold flange 55, and strut support 56 are made of the same material. In particular, in an additive manufacturing process, all elements may be integrally formed with one another. A benefit of the embodiment shown in FIG. 3 is manifold tube 52 maintains the desired rigidity while minimizing the amount of material required to provide the desired support and rigidity.

Figure 4:
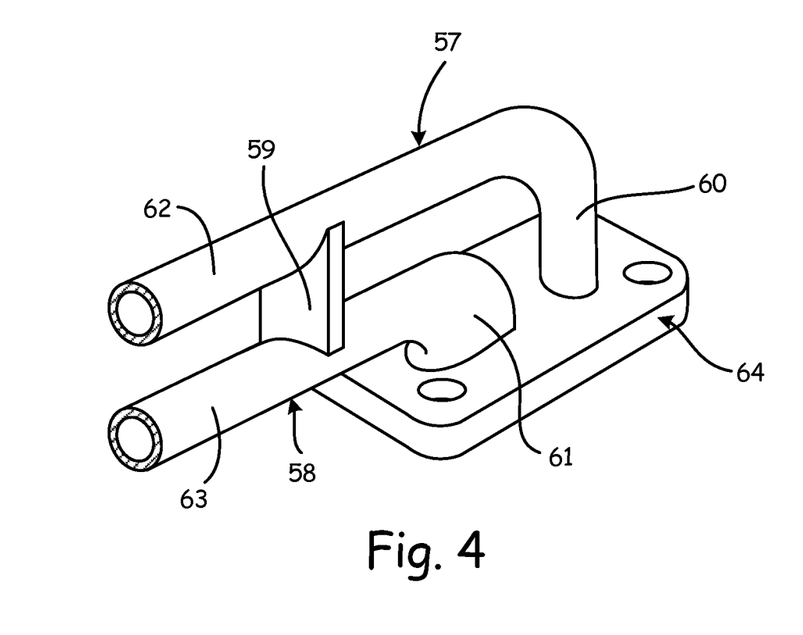
FIG. 4 is a perspective view of manifold tubes with inter-tube strut support according to another embodiment of the present invention.

FIG. 4 is a perspective view of a pair of manifold tubes 57 and 58 with inter-tube strut support 59 according to another embodiment of the present invention. Each manifold tube 57 and 58 again includes a first end (60 and 61, respectively) and a second end (62 and 63, respectively). Each manifold tube 57 and 58 is connected to manifold flange 64 at respective first ends 60 and 61. To provide rigidity and support to manifold tubes 57 and 58 and increase the natural frequency, strut support 59 is connected between the respective second ends 62 and 63 of manifold tubes 57 and 58. Once again, in one embodiment, manifold tubes 57 and 58, strut support 59, and manifold flange 64 are made of the same material. Once again, in an additive manufacturing process, all elements may be integrally formed with one another. A benefit of the embodiment shown in FIG. 4 is manifold tubes 57 and 58 maintain the desired rigidity while minimizing the amount of material required to provide the desired support and rigidity.

Figure 5:
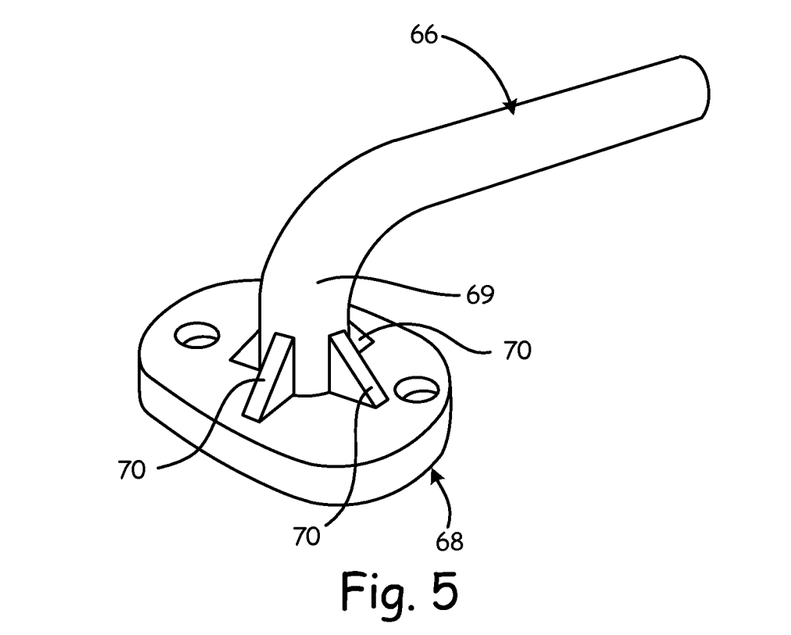
FIGS. 5-7 are perspective views of a manifold tube connected to a manifold flange according to various embodiments of the present invention.
Figures 6A, 6B:
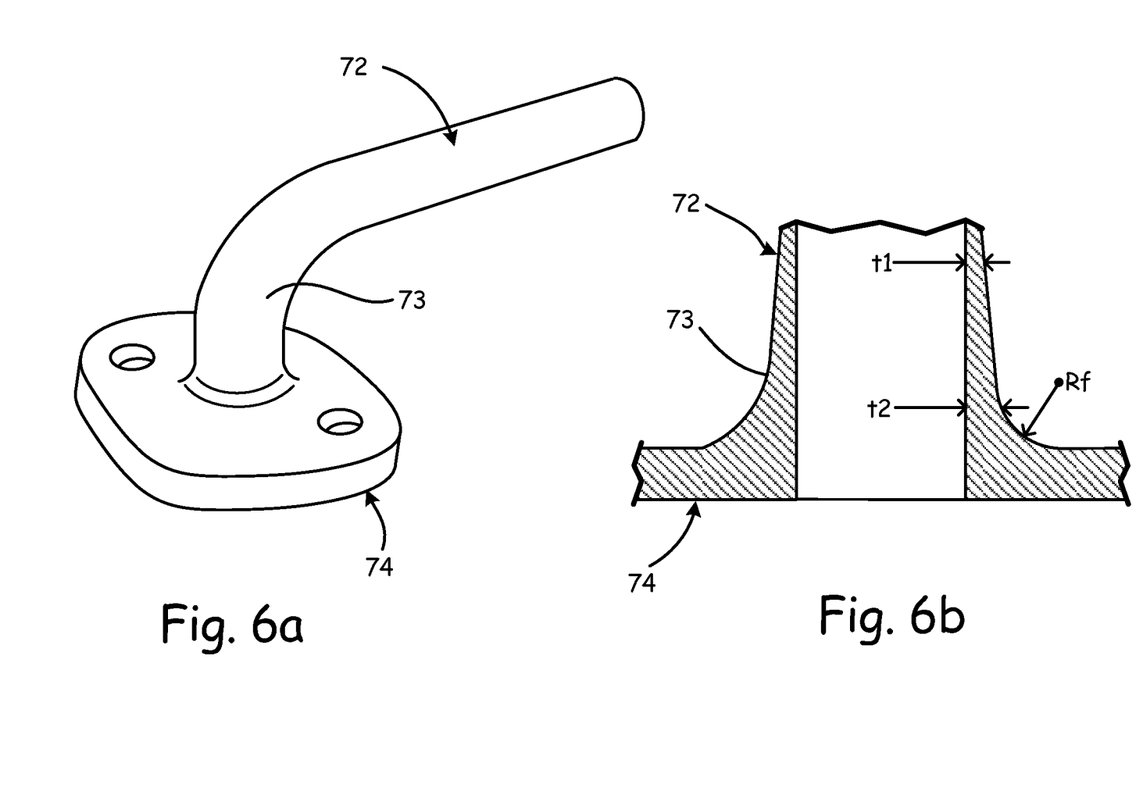
Figure 7:
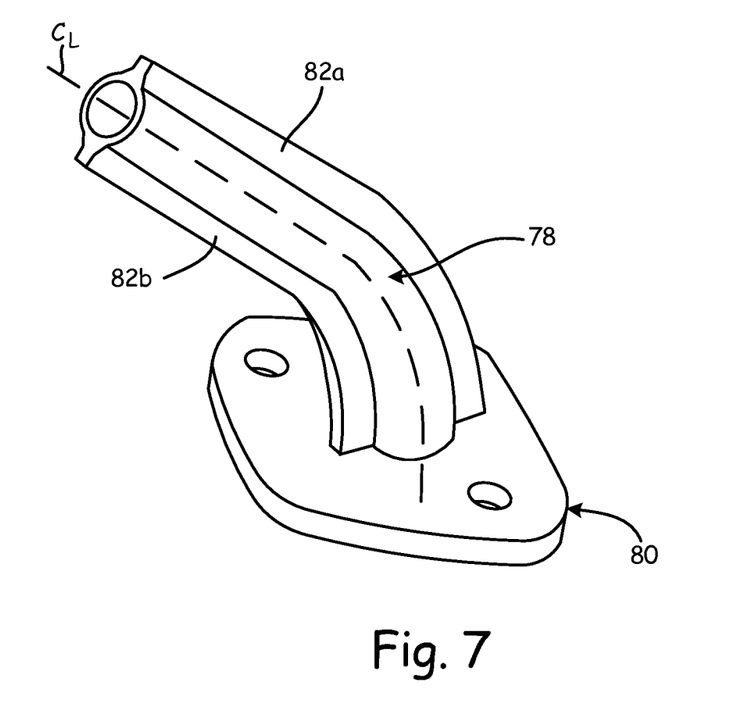

FIGS. 5-7 are perspective views illustrating the connection of a manifold tube to a manifold flange according to various embodiments of the present invention.

In FIG. 5, manifold tube 66 is connected to manifold flange 68 at first end 69. Moment connection between manifold tube 66 and manifold flange 68 is provided by tube-to-flange gussets 70 connected between manifold tube 66 and manifold flange 68. In the embodiment shown in FIG. 5, tube-to-flange gussets 70 are integrally formed with both manifold tube 66 and manifold flange 68 and are located equidistantly around a circumference of manifold tube 66. Once again, utilizing an additive manufacturing process allows all elements (e.g., manifold tube, manifold flange, and gussets) to be integrally formed with one another. A benefit of the embodiment shown in FIG. 5 is manifold tube 66 provides the desired moment connection between manifold tube 66 and manifold flange 68 while minimizing the amount of material required.

FIGS. 6a and 6b are perspective and cross-sectional views, respectively, illustrating the connection of manifold tube 72 at first end 73 to manifold flange 74. Moment connection between manifold tube 72 and manifold flange 74 is provided by increasing the width of the wall associated with first end 73 of manifold tube 72 at the point of connection with manifold flange 74.

The cross-sectional view shown in FIG. 6b provides additional details regarding the point of connection between manifold tube 72 and manifold flange 74. In particular, the thickness of the walls associated with manifold tube 72 is illustrated at a location distal from manifold flange 74 (thickness t1) and at a location proximate to manifold flange 74 (thickness t2). In the embodiment shown in FIGS. 6a and 6b, the thickness t2 of the portion of the wall located proximate to manifold flange 74 is greater than the thickness t1 of the portion of the wall located distal to manifold flange 74. In addition to wall thicknesses distal and proximate to manifold flange 74, fillet section 76 may also be modified to provide additional support along the point of connection between manifold tube 72 and manifold flange 74. For example, by increasing the fillet radius Rf, additional material is provided near the point of connection 76 to increase the moment connection between manifold flange 74 and manifold tube 72. Once again, utilizing an additive manufacturing process allows all elements (e.g., manifold tube, manifold flange, and point of connection) to be integrally formed with one another. A benefit of the embodiment shown in FIG. 5 is manifold tube 66 provides the desired moment connection between manifold tube 72 and manifold flange 74 while minimizing the amount of material required.

In FIG. 7, manifold tube 78 is connected to manifold flange 80, and includes first and second ribs 82a and 82b located on an outer circumference of manifold tube 78, parallel with a centerline axis $C_L$ associated with manifold tube 78. A benefit of first and second ribs 82a and 82b is they provide directional stiffness to manifold tube 78. In the embodiment shown in FIG. 7, two ribs are utilized, spaced on opposite sides of manifold tube 78, although in other embodiments more or fewer ribs may be employed. Once again, utilizing an additive manufacturing process allows all elements (e.g., manifold tube, first and second ribs) to be integrally formed with one another. In addition, first and second ribs 82a and 82b may extend partially along the length of manifold tube 78, or along the entire length as shown in FIG. 7.

Figure 8A:
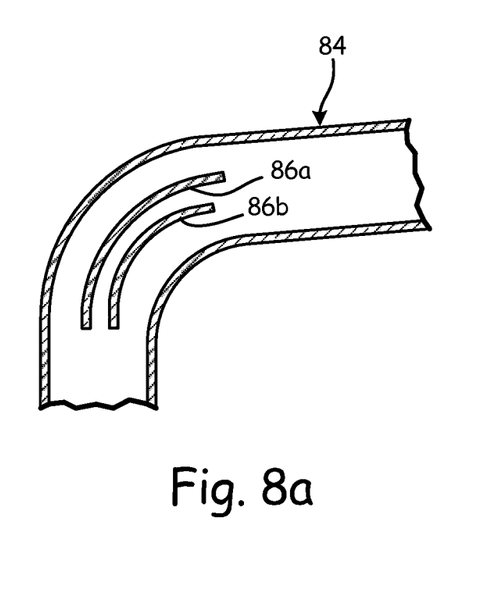
FIGS. 8a and 8b are partial cross-sectional views illustrating the location of turning vanes within a manifold tube according to an embodiment of the present invention.
Figure 8B:
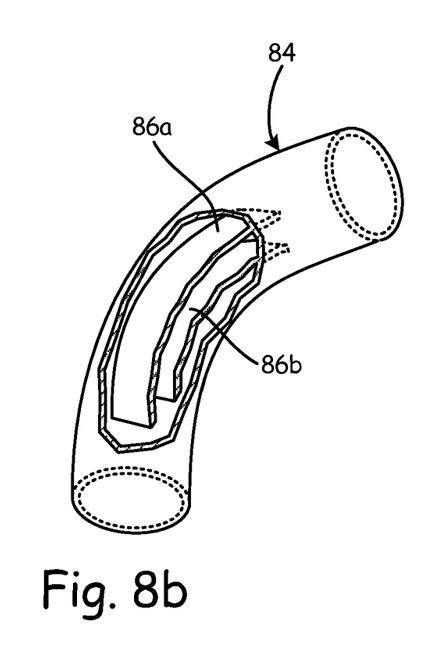

FIGS. 8a and 8b are cross-sectional views of manifold tube 84 that illustrate the location of first and second turning vanes 86a and 86b according to an embodiment of the present invention. In particular, FIG. 8a is a side cross-sectional view that illustrates first and second turning vanes 86a and 86b located within manifold tube 84. In the embodiment shown in FIG. 8a, first and second turning vanes 86a and 86b are located equidistant from an interior sidewall of manifold tube 84. The purpose of first and second turning vanes is to aid in directing the flow of fluid through the turn in manifold tube 84. In particular, turning vanes 86a and 86b improve the flow of fluids in high-speed flow applications.

FIG. 8b is a perspective, partial cutaway view of manifold tube 84 that illustrates the geometry of turning vanes 86a and 86b within the interior sidewalls of manifold tube 84. In the embodiment shown in FIGS. 8a and 8b, turning vanes 86a and 86n extend from one side of manifold tube 84 to the other side of manifold tube 84 (i.e., across the entire cross-section of manifold tube 84). In other embodiments, turning vanes 86a and 86b extend only partially between the interior sidewalls of manifold tube 84, and one or more supports are used to support turning vanes 86a and 86b. In one embodiment, the one or more supports would extend from the side portions of turning vanes 86a and 86b, respectively. In other embodiments, additional supports may be located on the side portion opposite of the side portions, and would similarly extend away from turning vanes 86a and 86b toward the interior sidewall of manifold tube 84. In still other embodiments, based on desired flow characteristics, greater or fewer supports may be employed, and may be located at various located between turning vanes 86a, 86b and interior sidewall portions of manifold tube 84.

The geometry of turnings vanes 86a and 86b, as well as any additional supports included with respect to the turning vanes 86a and 86b, may be selected in part based on the manufacturing process. In one embodiment, manifold tube 84 is manufactured using an addictive manufacturing process in which the tube is built up layer by layer. By orienting the one or more supports in the direction of the additive manufacturing process, the support can be used during the manufacturing process to support the construction of turning vanes 86a and 86b, as well as during operation to support and locate turning vanes 86a and 86b within manifold tube 84.

FIG. 8b further illustrates the shape of turning vanes 86a, 86b. In particular, in the embodiment shown in FIG. 9b, turning vanes 86a and 86b have a rectangular cross-section, wherein a width of the turning vane is greater than a height of the turning vane. In other embodiments, various other geometries may be utilized.

Figure 9A:
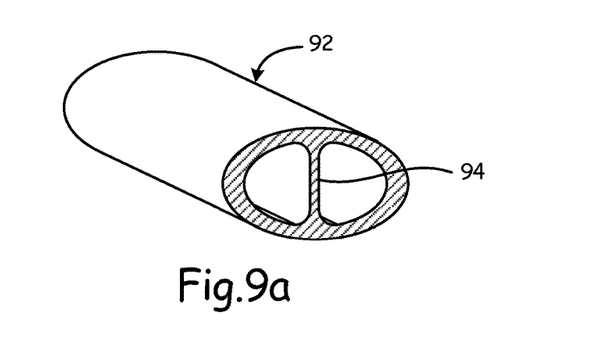
Figure 9B:
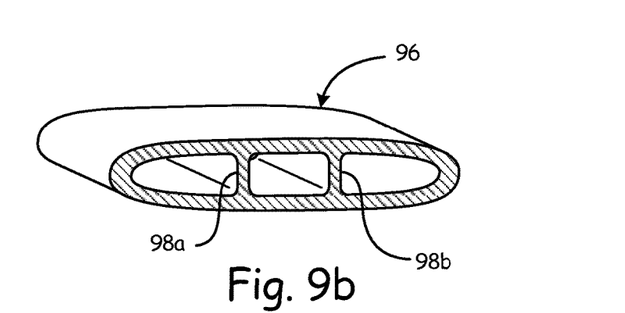
Figure 9C:
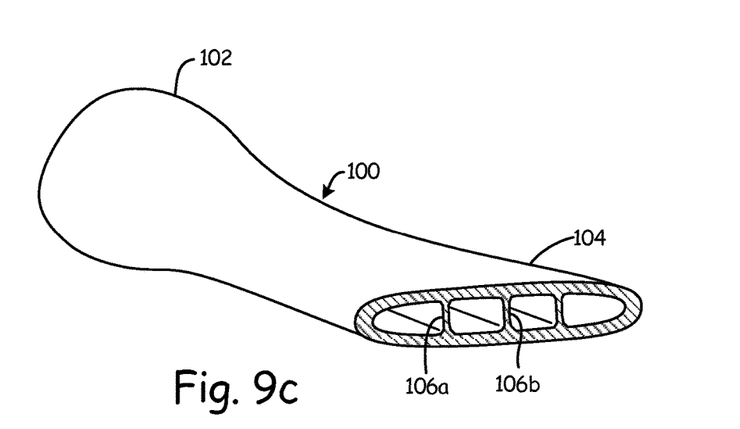

FIGS. 9a-9c are partial cross-sectional views of various manifold tube geometries according to various embodiments of the present invention. In previous embodiments, manifold tubes have utilized a circular geometry. In particular, in the embodiment shown in FIG. 9a, manifold tube 92 utilizes an elliptical cross-sectional geometry. In addition, center support structure 94 is provided within the interior of manifold tube 92 to provide additional, interior structural support to the tube. In the embodiment shown in FIG. 9a, center support structure 94 is aligned with the semi-minor axis of the ellipse (shortest distance between opposite sidewalls), and may be located at select locations along the length of manifold tube 92 or may extend the entire length of manifold tube 92. In other embodiments, center support structure 94 may be located along the semi-major axis of the ellipse (longest distance between opposite sidewalls).

In FIG. 9b, manifold tube 96 utilizes an elliptical cross-sectional geometry as shown in FIG. 9a, but further includes additional support structures 98a and 98b located within the interior of manifold tube 92. As compared with the geometry illustrated in FIG. 9a, manifold tube 96 utilizes a major axis that is significantly longer than the minor axis of the ellipse. To accommodate the longer major axis, two support structures 98a and 98b are utilized. As discussed with FIG. 9a, above, support structures 98a and 98b may be located at select locations along length of manifold tube 96 or may extend the entire length of manifold tube 96.

In FIG. 9c, manifold tube 100 has a cross-sectional geometry that varies along the length of manifold tube 96. In the embodiment shown in FIG. 9c, manifold tube 100 has a circular cross-sectional geometry at first end 102 and an elliptical cross-sectional geometry at second end 104. Within the portion of manifold tube 100 that has an elliptical cross-sectional geometry, one or more supports structures (e.g., support structures 106a, 106b, and 106c in the embodiment shown in FIG. 9c) are utilized to provide support. In the embodiment shown in FIG. 9c, the cross-sectional area of the circular portion is the same as the cross-sectional area of the elliptical portion. In this way, the volume of fluid that is allowed to flow within different portions of manifold tube 100 remains the same even as the cross-sectional geometry of manifold tube 100 changes. However, depending on the application, in other embodiments the cross-sectional geometry of manifold tube 100 may be allowed to vary along the length of manifold tube 100.

Figures 10A, 10B:
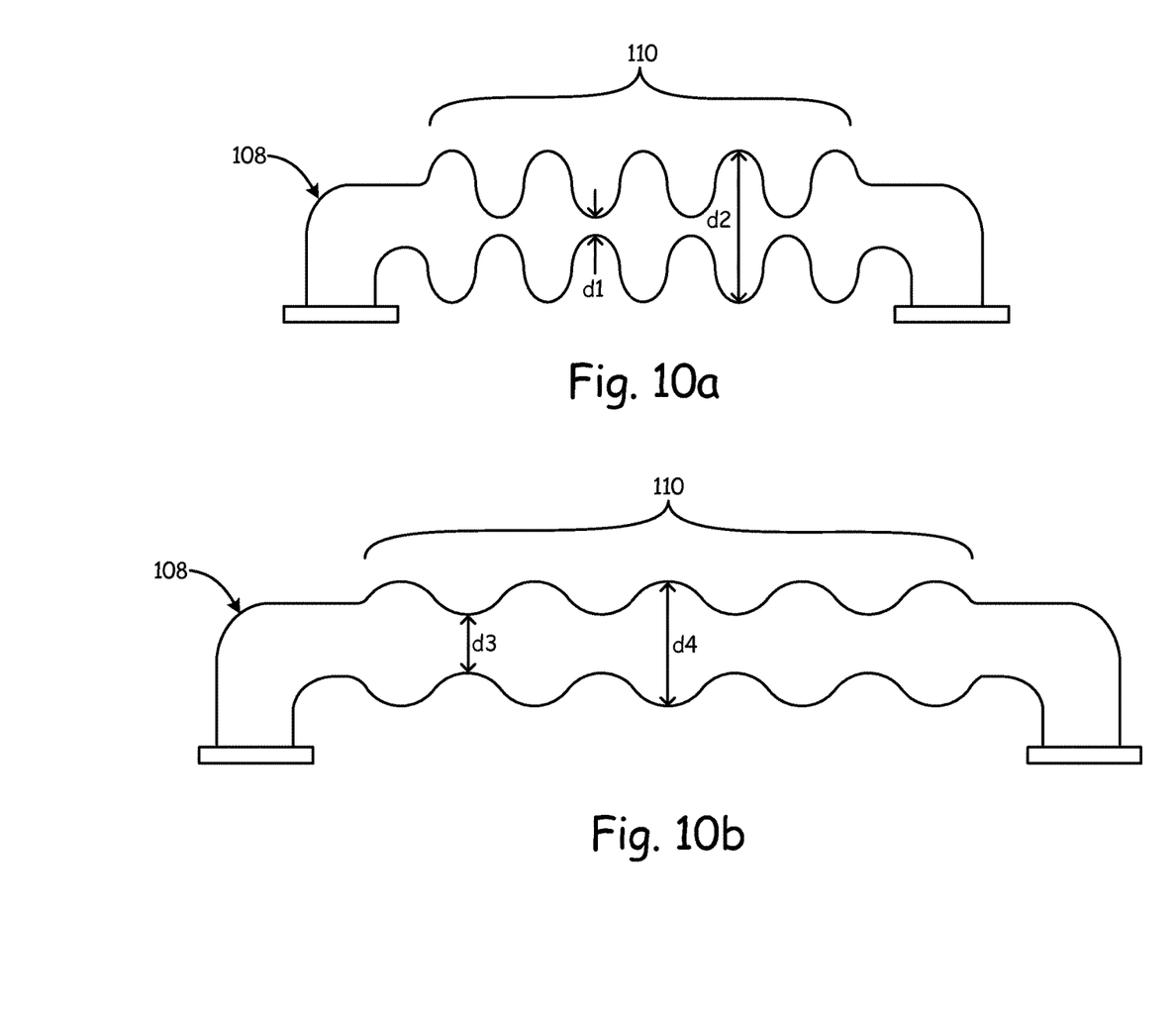
FIGS. 10a and 10b are side views of a manifold tube that includes bellows according to an embodiment of the present invention.

FIGS. 10a and 10b are side views of manifold tube 108 during different stages of thermal expansion/contraction according to an embodiment of the present invention. In the embodiment shown in FIGS. 10a and 10b, manifold tube 108 includes bellow section 110. The term "bellows" is used here to describe a tube section whose volume can be modified by the compression or expansion of bellows section 110. For example, in FIG. 10a, bellows section 110 is compressed as compared with bellows section 110 shown in FIG. 10b. It should be noted that the figures are meant to exaggerate the amount of expansion and compression provided for the purpose of illustration. As a result of the compression, the volume associated with bellows section 110 is less in the compressed state shown in FIG. 10a as compared with the uncompressed state shown in FIG. 10b. A benefit of includes bellows section 110 along at least a portion of manifold tube 108 is it allows manifold tube 108 to withstand large thermal transients. In addition, bellows section includes an interior diameter (distance between opposite sidewalls, labeled as "d1" and "d2") that varies along the length of bellows section 110. As a result, the cross-sectional flow area through bellows section varies along the length of the bellows section. Furthermore, the respective distances vary as bellows section 110 is compressed or expanded. In one embodiment, bellows section 110 is comprised of a material that is more flexible than the material utilized for the remainder of manifold tube 108, although in other embodiments the same material may be used for both bellows 110 and manifold tube 108.

Figure 11:
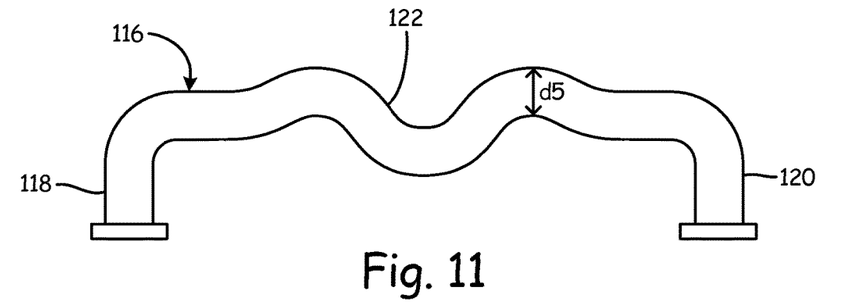
FIG. 11 is a side view of a manifold tube that includes a pre-buckled portion according to an embodiment of the present invention.

FIG. 11 is a side view of manifold tube 116 that addresses thermal compliance according to another embodiment of the present invention. Manifold tube 116 includes first and second ends 118 and 120 and pre-buckled portion 122. Pre-buckled portion 122 provides a mechanism to handle relative movement between first end 118 and second end 120 (due likely to thermal expansion/contraction) without breaking manifold tube 116. In contrast with the embodiment described with respect to FIGS. 10*a* and 10*b* utilizing "bellows", the embodiment shown in FIG. 11 does not result in a change in the volume of manifold tube 108. Furthermore, a distance d5 between opposite interior sidewalls of manifold tube 108 remains constant along pre-buckled portion 122.

Figure 12A:
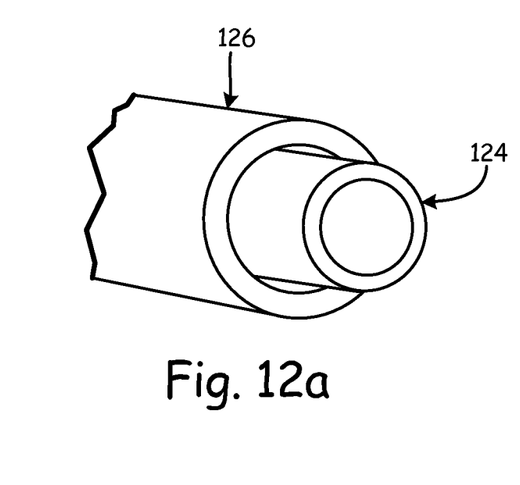
FIGS. 12a and 12b are perspective views of heat shielding provided around a manifold tube according to an embodiment of the present invention.
Figure 12B:
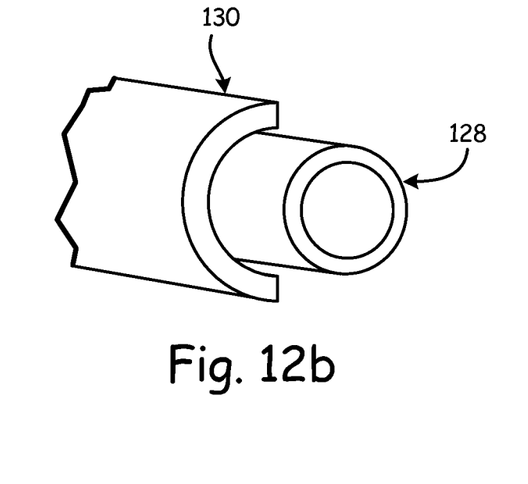

FIGS. 12*a* and 12*b* are perspective views of manifold tube 124, 128, respectively, with selective heat shielding providing according to an embodiment of the present invention. FIG. 12*a* illustrates an embodiment in which manifold tube 124 is fully enclosed within heat shield 126. FIG. 12*b* illustrates an embodiment in which a select portion (e.g., side) of manifold tube 128 is enclosed within heat shield 130.

In both embodiments, heat shields 126 and 130 provide thermal insulation and may be used to prevent external thermal energy from being added to the fluid communicated by manifold tubes 124, 128, or to prevent thermal energy from the fluid communicated by manifold tubes 124, 128 from being communicated to components external to either manifold tube. In particular, additive manufacturing processes allow heat shield portions to be built only over select portions of the manifold tube as shown in FIG. 12*b*. A benefit of this approach, is if thermal leakage is only a concern with respect to a particular component located on one side of manifold tube 128, there is no need to include the additional weight associated with including a heat shield on the opposite side of manifold tube 128.

FIGS. 13*a*-13*d* illustrates another embodiment of manifold tube 132 utilizing heat shield component 134. In the embodiment shown in FIG. 14*a*, heat shield component 134 is positioned over a select portion of manifold tube 132, although in other embodiment heat shield component 134 may be included over more or less of manifold tube 132. Heat shield component 134 includes first end 136 and second end 138.

Figure 13A:
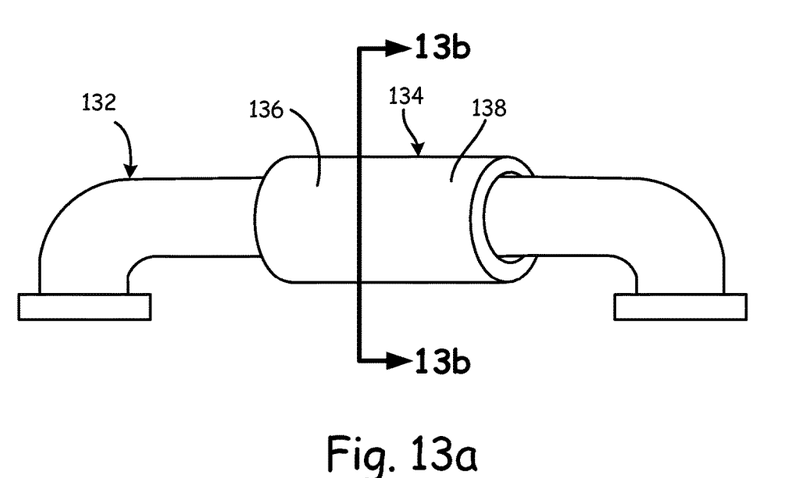
FIG. 13a-13d are cross sectional views illustrating the connection between the manifold tube and the heat shield according to various embodiments of the present invention.
Figure 13B:
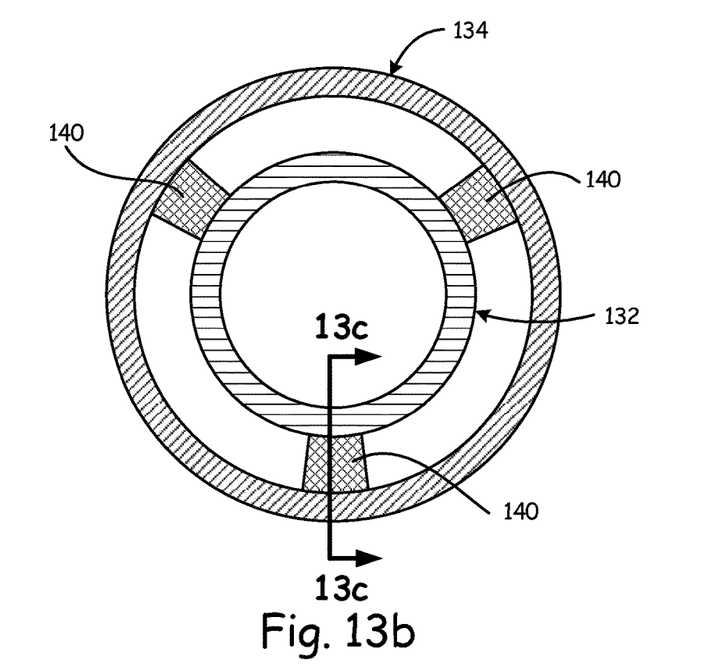

FIG. 13*b* is a cross-sectional view of manifold tube 132 and heat shield component 134 taken along cross-sectional line 13*b*-13*b*. In the embodiment shown in FIG. 13*b*, stand-off component 140 is used to create a minimum distance between manifold tube 132 and heat shield 134. The purpose of stand-off component 140 is to account for differences in thermal growth characteristics between manifold tube 132 and heat shield 134. In the embodiment shown in FIG. 14*b*, a plurality of stand-off components are located equidistantly around manifold tube 132.

Figure 13C:
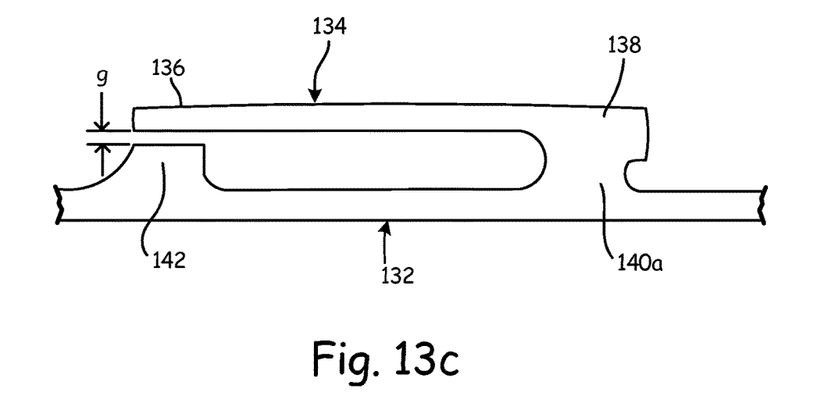
Figure 13D:
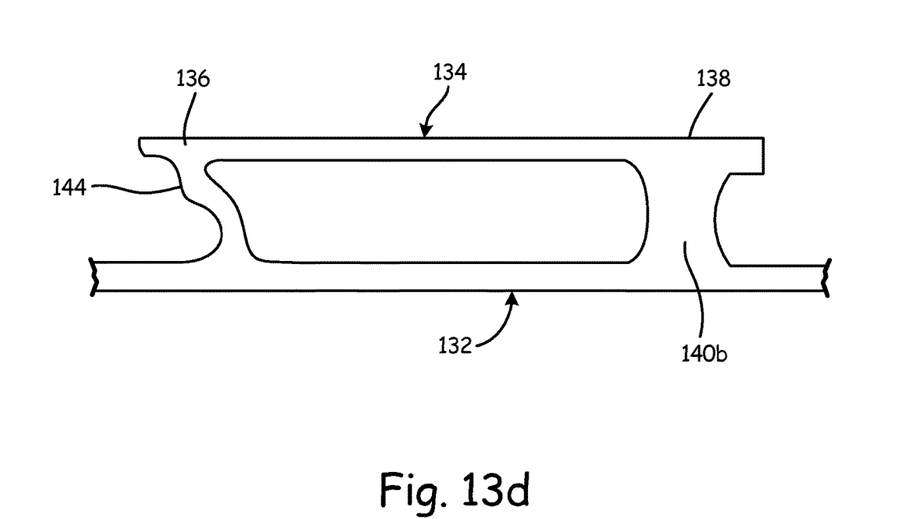

FIGS. 13*c* and 13*d* illustrate implementation of stand-off component 140 according to two different embodiments. In the embodiment shown in FIG. 13*c*, stand-off component 140*a* is integrally formed between manifold tube 132*a* and heat shield 134*a* at second end 138. In addition, a second stand-off portion 142 is integrally formed with manifold tube 132*a*, but is not in contact (or at least, not integrally formed) with heat shield 134*a* at first end 136. A small gap 'g' between second stand-off portion 142 and first end 136 of heat shield 134*a* allows for thermal growth between heat shield component 134*a* and manifold tube 132*a*.

In the embodiment shown in FIG. 13*d*, stand-off component 140*b* is once again integrally formed between manifold tube 132*b* and heat shield 134 at second end 138. However, the embodiment shown in FIG. 13*d* includes flexure component 144 integrally formed between heat shield 134*b* and manifold tube 132*b*. Flexure component 144 includes a bend that provides thermal compliance between heat shield 134*b* and manifold tube 132*b*. That is, dissimilar growth between heat shield 134*b* and manifold tube 132*b* is accounted for by flexure component 144.

Discussion of Possible Embodiments

The following are non-exclusive descriptions of possible embodiments of the present invention.

A fuel/oil manifold according to an exemplary embodiment of this disclosure, among other possible things includes first and second manifold flanges located in non-parallel planes with one another and a manifold tube connected at a first end to the first manifold flange and at a second end to the second manifold flange. The first manifold tube includes at least one turn between the first end and the second end that includes a non-zero tube bend radius defined as the ratio of a turn radius to a diameter of the manifold tube.

A further embodiment of the foregoing fuel/oil manifold, wherein the tube bend radius may be greater than one.

A further embodiment of any of the foregoing fuel/oil manifolds, wherein the manifold tube may include tube-to-flange gussets connected between the first end of the manifold tube and the first manifold flange.

A further embodiment of any of the foregoing fuel/oil manifolds, wherein the first end of the manifold tube may include a tube thickness that is increased proximate to the first manifold flange.

A further embodiment of any of the foregoing fuel/oil manifolds, wherein the manifold tube may include at least one rib located on an outer circumference of the manifold tube, parallel with a centerline axis associated with manifold tube.

A further embodiment of any of the foregoing fuel/oil manifolds, in which one or more turning vanes may be located within an interior portion of the manifold tube at the at least one turn.

A further embodiment of any of the foregoing fuel/oil manifolds, in which one or more struts may be connected between the one or more turning vanes and an interior wall of the manifold tube to locate and support the turning vane within the interior portion of the manifold tube.

A further embodiment of any of the foregoing fuel/oil manifolds, in which at least one support strut may be connected between the first manifold flange and the manifold tube.

A further embodiment of any of the foregoing fuel/oil manifolds, wherein the at least one support strut may be connected to the second end of the manifold tube.

A further embodiment of any of the foregoing fuel/oil manifolds, in which a second manifold tube may be connected at a first end to the first manifold flange and a tube-to-tube support strut may be connected between the first manifold tube and the second manifold tube.

A further embodiment of any of the foregoing fuel/oil manifolds, wherein the manifold tube may have a circular or elliptical cross-sectional geometry.

A further embodiment of any of the foregoing fuel/oil manifolds, wherein the manifold tube may further include at least one support structure connected between opposite interior walls of the manifold tube.

A further embodiment of any of the foregoing fuel/oil manifolds, wherein the manifold tube may further includes a bellows portion located between the first and second end of the manifold tube, wherein the bellows provide a reduced volume in a compressed state and an increased volume in an uncompressed state.

A further embodiment of any of the foregoing fuel/oil manifolds, wherein a diameter of the manifold tube may vary along a length of the bellows.

A further embodiment of any of the foregoing fuel/oil manifolds, wherein the manifold tube may further include a pre-buckled portion that includes first and second turns without a change in direction of the manifold tube and in which a diameter of the manifold tube remains constant.

A further embodiment of any of the foregoing fuel/oil manifolds, in which a heat shield may surround at least a portion of the manifold tube, wherein the heat shield has a first and second end.

A further embodiment of any of the foregoing fuel/oil manifolds, wherein the heat shield may be separated from the manifold tube by a first stand-off portion integrally formed between the heat shield and the manifold tube at the first end and a second stand-off portion integrally formed with the manifold tube on the second end, wherein a gap is provided between the heat shield and the second stand-off portion at the second end.

A further embodiment of any of the foregoing fuel/oil manifolds, wherein the heat shield may be separated from the manifold tube by a first stand-off portion integrally formed between the heat shield and the manifold tube at the first end and a flexure component integrally formed between the heat shield and the manifold tube at the second end, wherein the flexure component includes a bend that provides thermal compliance.

Although the present invention has been described with reference to preferred embodiments, workers skilled in the art will recognize that changes may be made in form and detail without departing from the spirit and scope of the invention.

The invention claimed is:

1. A fuel/oil manifold manufactured using additive manufacturing comprising:
   a first manifold flange;
   a second manifold flange;
   a third manifold flange, wherein the first manifold flange, the second manifold flange, and the third manifold flange are in non-parallel planes with one another;
   a first manifold tube connected at a first end to the first manifold flange and at a second end to the second manifold flange, the first manifold tube including at least one first turn between the first end and the second end of the first manifold tube that includes a non-zero first tube bend radius defined as the ratio of a first turn radius to a diameter of the first manifold tube; and
   a second manifold tube connected at an one end to the first manifold flange and at an other end to the third manifold flange, the second manifold tube including at least one second turn between the one end and the other end of the second manifold tube that includes a non-zero second tube bend radius defined as the ratio of a second turn radius to a diameter of the second manifold tube,
   wherein the first manifold flange and the second manifold flange are formed integrally with the first manifold tube; and
   wherein the first manifold flange and the third manifold flange are formed integrally with the second manifold tube.

2. The fuel/oil manifold of claim 1, wherein at least one of the first tube bend radius and the second tube bend radius is greater than one.

3. The fuel/oil manifold of claim 1, wherein the first manifold tube includes tube-to-flange gussets connected between the first end of the first manifold tube and the first manifold flange.

4. The fuel/oil manifold of claim 1, wherein the first end of the first manifold tube includes a tube thickness that is increased proximate to the first manifold flange.

5. The fuel/oil manifold of claim 1, wherein the first manifold tube includes at least one rib located on an outer circumference of the first manifold tube, parallel with a centerline axis associated with the first manifold tube.

6. The fuel/oil manifold of claim 1, further including:
   one or more turning vanes located within an interior portion of the first manifold tube at the at least one first turn.

7. The fuel/oil manifold of claim 6, further including:
   one or more struts connected between the one or more turning vanes and an interior wall of the first manifold tube to locate and support the one or more turning vanes within the interior portion of the first manifold tube.

8. The fuel/oil manifold of claim 1, further including:
   at least one support strut connected between the first manifold flange and the first manifold tube.

9. The fuel/oil manifold of claim 8, wherein the at least one support strut is connected to the second end of the first manifold tube.

10. The fuel/oil manifold of claim 1, further including:
    a tube-to-tube support strut connected between the first manifold tube and the second manifold tube.

11. The fuel/oil manifold of claim 1, wherein at least one of the first manifold tube and the second manifold tube has one of a circular or elliptical cross-sectional geometry.

12. The fuel/oil manifold of claim 1, wherein the first manifold tube further includes at least one support structure connected between opposite interior walls of the first manifold tube.

13. The fuel/oil manifold of claim 1, wherein the first manifold tube further includes:
    a bellows portion located between the first end and the second end of the first manifold tube, wherein the bellows provide a reduced volume in a compressed state and an increased volume in an uncompressed state.

14. The fuel/oil manifold of claim 13, wherein a diameter of the first manifold tube varies along a length of the bellows.

15. The fuel/oil manifold of claim 1, wherein the first manifold tube further includes:
    a pre-buckled portion that includes first and second turns of the at least first turn without a change in direction of the first manifold tube and in which a diameter of the first manifold tube remains constant.

16. The fuel/oil manifold of claim 1, further including:
    a heat shield surrounding at least a portion of the first manifold tube and having a first heat shield end and a second heat shield end.

17. The fuel/oil manifold of claim 16, wherein the heat shield is separated from the first manifold tube by a first stand-off portion integrally formed between the heat shield and the first manifold tube at the first heat shield end and a second stand-off portion integrally formed with the first manifold tube on the second heat shield end, wherein a gap is provided between the heat shield and the second stand-off portion at the second end.

18. The fuel/oil manifold of claim 16, wherein the heat shield is separated from the first manifold tube by a first stand-off portion integrally formed between the heat shield and the first manifold tube at the first heats shield end and a flexure component integrally formed between the heat shield and the first manifold tube at the second heat shield end, wherein the flexure component includes a bend that provides thermal compliance.

* * * * *